United States Patent
Svorc et al.

(10) Patent No.: US 9,935,553 B2
(45) Date of Patent: Apr. 3, 2018

(54) CONTROL SCHEME FOR HYSTERETIC BUCK CONTROLLER WITH INDUCTOR COIL CURRENT ESTIMATION

(71) Applicant: Dialog Semiconductor (UK) Limited, Reading (GB)

(72) Inventors: Jindrich Svorc, Prague-Praha (CZ); Hidenori Kobayashi, Kawasaki (JP)

(73) Assignee: Dialog Semiconductor (UK) Limited, Reading (GB)

( * ) Notice: Subject to any disclaimer, the term of this patent is extended or adjusted under 35 U.S.C. 154(b) by 0 days.

(21) Appl. No.: 14/689,573

(22) Filed: Apr. 17, 2015

(65) Prior Publication Data

US 2016/0306371 A1 Oct. 20, 2016

(51) Int. Cl.
*H02M 3/158* (2006.01)
*G05F 1/575* (2006.01)
*H02M 1/00* (2006.01)

(52) U.S. Cl.
CPC .......... *H02M 3/1588* (2013.01); *G05F 1/575* (2013.01); *H02M 2001/0009* (2013.01)

(58) Field of Classification Search
CPC ....................................... H02M 3/156–3/1588
See application file for complete search history.

(56) References Cited

U.S. PATENT DOCUMENTS

| | | | |
|---|---|---|---|
| 4,492,913 A | 1/1985 | Arnold et al. | |
| 4,970,415 A * | 11/1990 | Fitzpatrick | G05F 3/245 323/313 |
| 5,568,368 A * | 10/1996 | Steigerwald | H02J 3/38 363/132 |
| 6,037,754 A | 3/2000 | Harper | |
| 6,271,605 B1 * | 8/2001 | Carkner | H02J 7/0031 307/125 |
| 6,381,159 B2 * | 4/2002 | Oknaian | H02M 3/156 323/282 |
| 6,707,281 B2 | 3/2004 | Solivan | |
| 7,053,595 B1 | 5/2006 | Mei et al. | |
| 8,698,470 B2 | 4/2014 | Ju | |
| 8,766,617 B2 | 7/2014 | Wan et al. | |
| 9,065,337 B2 | 6/2015 | Tanabe et al. | |
| 2001/0046145 A1 * | 11/2001 | Oknaian | H02M 3/156 363/98 |
| 2009/0059623 A1 * | 3/2009 | Cai | H02M 1/44 363/21.02 |
| 2009/0140711 A1 | 6/2009 | Philbrick et al. | |

(Continued)

OTHER PUBLICATIONS

J. Sun and M. Chen, "Nonlinear Average Current Control UsingPartial Current Measurement," in IEEE Transactions on Power Electronics, vol. 23, No. 4, pp. 1641-1648, Jul. 2008.*

(Continued)

*Primary Examiner* — Gary L Laxton
*Assistant Examiner* — Peter Novak
(74) *Attorney, Agent, or Firm* — Saile Ackerman LLC; Stephen B. Ackerman

(57) ABSTRACT

A circuit and method for power converter for improved current monitoring, comprising a buck converter comprising a high side switch, a current sensing circuits parallel to the buck converter configured to sense a current through a low side switch, and a positive slope inductor coil estimator sensing circuit parallel to a buck converter configured to estimate a current magnitude.

15 Claims, 6 Drawing Sheets

(56) References Cited

U.S. PATENT DOCUMENTS

| | | | | |
|---|---|---|---|---|
| 2010/0019749 A1* | 1/2010 | Katsuya | ............... | H02M 1/15 323/282 |
| 2010/0141225 A1* | 6/2010 | Isham | ............... | H02M 3/156 323/282 |
| 2010/0327659 A1* | 12/2010 | Lisi | ............... | H01L 31/02021 307/82 |
| 2011/0018515 A1* | 1/2011 | McCloy-Stevens | | H02M 3/1588 323/284 |
| 2012/0049826 A1* | 3/2012 | Hsu | ............... | H02M 3/1588 323/284 |
| 2012/0146599 A1* | 6/2012 | Oyama | ............... | H02M 3/1588 323/271 |
| 2013/0193941 A1* | 8/2013 | DeFazio | ............... | G05F 1/46 323/282 |
| 2014/0002037 A1* | 1/2014 | Babazadeh | ............... | H02M 3/156 323/271 |
| 2014/0239925 A1* | 8/2014 | Tanabe | ............... | H02M 3/1582 323/271 |
| 2014/0247026 A1 | 9/2014 | Svorc | | |
| 2016/0336857 A1* | 11/2016 | Liu | ............... | H02M 3/1588 |

OTHER PUBLICATIONS

German Exam Report, 10 2015 211 966.1, dated Jan. 20, 2016, Dialog Semiconductor (UK) Limited.

\* cited by examiner

600

610 Providing a hysteretic buck converter with a PMOS transistor pull-up, a NMOS transistor pull-down, a pre-drive circuit, a SR flip-flop, an inductor, a capacitor, an error amplifier, a compensation circuit, an NMOS Current Sensing block, a Positive Slope Coil Current Estimator, a SET comparator, and a RESET comparator

620 Estimating the current in the inductor when said PMOS transistor pull-up is turned ON

630 Increasing the inductor voltage vILint along the current in the inductor

640 Turning off said PMOS transistor when the inductor voltage vILint reaches the high error voltage vError_H

650 Sensing the current when said NMOS transistor is turned ON, using said current sensing circuit

660 Evaluating the inductor voltage vILint when connected to low error voltage vError_L during this period of time

670 Turning off said NMOS transistor when the coil current reaches the low error voltage vError_L

FIG. 6

CONTROL SCHEME FOR HYSTERETIC BUCK CONTROLLER WITH INDUCTOR COIL CURRENT ESTIMATION

BACKGROUND

Field

The disclosure relates generally to a buck controller and, more particularly, to a control method using inductor coil current estimation thereof.

Description of the Related Art

Voltage regulation is important where circuits are sensitive to transients, noise and other types of disturbances. The control of the regulated voltage is key in switched mode power supplies (SMPS) and in many hysteretic-based topologies. Switched mode power supply topologies include the buck converter topology.

In hysteretic-based topologies, one of the topologies includes a hysteretic current-mode (CM) topology.

FIG. 1 shows a typical hysteretic current-mode controller. The buck converter 100 consists of a SR flip-flop 105 with inputs SET 101 and RESET 102. The SR flip-flop 105 provides a DUTY signal output 107 to pre-drive circuitry 110. The signal VIN 115 provides power to the output circuit comprising of a p-channel metal oxide semiconductor field effect transistor (MOSFET) pull-up device 120 and an n-channel metal oxide semiconductor field effect transistor (MOSFET) pull-down device 125. The p-channel MOSFET can be referred to as a PMOS transistor, and the n-channel MOSFET can be referred to as a NMOS transistor. The center node VLX is connected between the p-channel MOSFET 120 and n-channel MOSFET 125 providing a current to the output. The output node is connected to the inductor 140, the output capacitor 145 for the output signal 150, and output load 160.

Both MOSes can be replaced with BJTs or any other types of semiconductor switches. PMOS can be replaced with NMOS and vice-versa A feedback network establishes a sensing scheme to current sensing circuit 130. Current in the inductor coil 140 is measured via current sensing circuits CSp 135 and CSn 137 where CSp 135 is active when PMOS P is ON and CSn 137 is active when NMOS N is ON. Both signals from the current sensing circuits are combined in the Current Sensing Block 130 and produce one signal ILint 139 which is an internal replica in the current in the coil. The circuit contains an Error amplifier 170 with the output signal 165, reference signal 167 coupled to a compensation network. The output of the Error Amplifier 170 is coupled to a compensation network. The error amplifier compares the output voltage with the reference voltage Vref and generates error signal vError. This signal is a base for two signals vError_H 175A and vError_L 175B which are shifted up and down from the vError by Voff/2 respectively. Internal coil current replica ILint is then compared with the vError_H 175A and vError_L 175B signals and resets (signal 185A) and sets (signal 185B) the main RS Flip-Flop FF1 105 which controls the switches.

FIG. 2 shows the timing diagram 200 for the signals. The p-channel MOS (PMOS) 210 and n-channel MOS (NMOS) 220 shows the switching of the output stage. The signal vError_H 230 and vError 240, and vError_L 250 describes the switching states of the error compensation network. The current through the inductor ILint 260 is overlaid on the switching states. In order to keep the frequency within given range several techniques can be implemented. The same is true for discontinuous current mode (DCM) mode of operation where current in the coil doesn't go below zero.

The described topology in FIG. 1, is good during transient events. The disadvantage of this prior art embodiment is the high quiescent current due to dual current sensing circuit which causes lower efficiency at light loads. In addition, a second disadvantage is the current sensing circuitry are usually noisy and layout sensitive. Additionally, another disadvantage is that the current sensing circuitry can also introduce switching noise.

U.S. Patent Application 2014/0247026 to Svorc describes a switched mode power supply having increased efficiency due to a loss-less coil current estimation for current control using a capacitor that has the same signal shape as the current through the coil inductor.

U.S. Pat. No. 8,698,470 to Ju shows a buck voltage regulator with mode switching based on sensing an integrated inductor current sense signal with an integrated reference signal. The patent also discusses switching from PWM and PFM operation in a buck converter.

U.S. Pat. No. 8,766,617 to Wan et al describes a method for improving voltage identification transient response by sensing the inductor current of a voltage regulator.

U.S. Pat. No. 7,053,595 to Mei et al shows a method and circuit for compensating offset errors caused by propagation delays in hysteretic control loops.

U.S. Pat. No. 6,707,281 to Solivan describes a voltage regulator that may include an inductor and a current detection circuit to detect current through the inductor.

U.S. Pat. No. 6,037,754 to Harper shows a circuit with inductor maximum current computation, inductor current comparator, and a current magnitude sensor.

In these prior art embodiments, the solution to establish a sampling circuit in switching regulator utilized various alternative solutions.

SUMMARY

It is desirable to provide a solution to address an efficient voltage regulator with minimal power consumption at light loads.

It is desirable to provide a solution does not impact the transient response of the controller.

It is desirable to provide a solution which does not increase the noise induced by the current sensing circuitry.

It is desirable to provide a solution that operates at higher switching frequency with an estimating circuit function with a smaller delay than a current sensing circuit.

A principal object of the present disclosure is to propose a solution using inductor coil current estimation technique for the current mode control.

In summary, a power converter, such as a buck converter, comprising a high side switch, a current sensing circuits parallel to the buck converter configured to sense a current through a low side switch, and a positive slope inductor coil estimator sensing circuit parallel to a buck converter configured to estimate a current magnitude.

In addition, a power converter comprising a circuit providing switching regulation with an inductor coil current estimator with an improved current monitor comprising an output stage configured to provide switching comprising a first and second transistor, a pre-drive circuit block configured to provide a signal to the output stage, a SR flip-flop configured to establish a duty cycle for the pre-drive circuit block, an inductor configured to receive a signal from the output stage, a capacitor and load configured to provide a load on the output, an error amplifier configured to provide feedback from the output, a compensation network configured to shape the frequency response in order to achieve stable system, a current sensing network configured to provide a signal from the output stage, and, an inductor coil current estimator configured to receive signals from the input signal, the output signal and DUTY signal.

In addition, a current estimator circuit comprises a transconductance network configured to provide an output current, a first switch configured to receive an output current, a second switch coupled to the first switch, an error signal configured to receive a signal from the second switch, and, an output node configured to be coupled between the first switch and the second switch.

A method of providing an improved current estimation in a power converter comprises the steps of a first step (a) providing a power converter comprises a low side switch, a high side switch, a current sensing circuit, a positive slope inductor coil estimator, an error amplifier, a compensation network, and a first and second comparator, a second step (b) sensing a current in a signal low side switch, a third step (c) estimating a current in a positive slope inductor coil estimator, and a fourth step (d) adjusting a current in the output of the power converter.

In addition, a method is disclosed in accordance with the embodiment of the disclosure. A method of providing an improved current estimation in a switching regulator comprises the steps of a first step (a) providing a hysteretic buck converter with a PMOS transistor pull-up, a NMOS transistor pull-down, a pre-drive circuit, a SR flip-flop, an inductor, a capacitor, an error amplifier, a compensation circuit, an NMOS Current Sensing block, a Positive Slope Coil Current Estimator, a SET comparator, and a RESET comparator, a second step (b) estimating the current in the inductor when the PMOS transistor pull-up is turned ON, a third step (c) increasing the voltage vILint along the current in the inductor, a fourth step (d) turning off the PMOS transistor when the voltage vILint reaches the high error voltage vError_H, a fifth step (e) sensing the current when the NMOS transistor is turned ON, using the current sensing circuit, a sixth step (f) evaluating the inductor voltage vILint when connected to low error voltage vError_L during this period of time; and, a seventh step turning off the NMOS transistor when the coil current reaches the low error voltage vError_L.

Other advantages will be recognized by those of ordinary skill in the art.

BRIEF DESCRIPTION OF THE DRAWINGS

The present disclosure and the corresponding advantages and features provided thereby will be best understood and appreciated upon review of the following detailed description of the disclosure, taken in conjunction with the following drawings, where like numerals represent like elements, in which.

DETAILED DESCRIPTION

Figure 1:
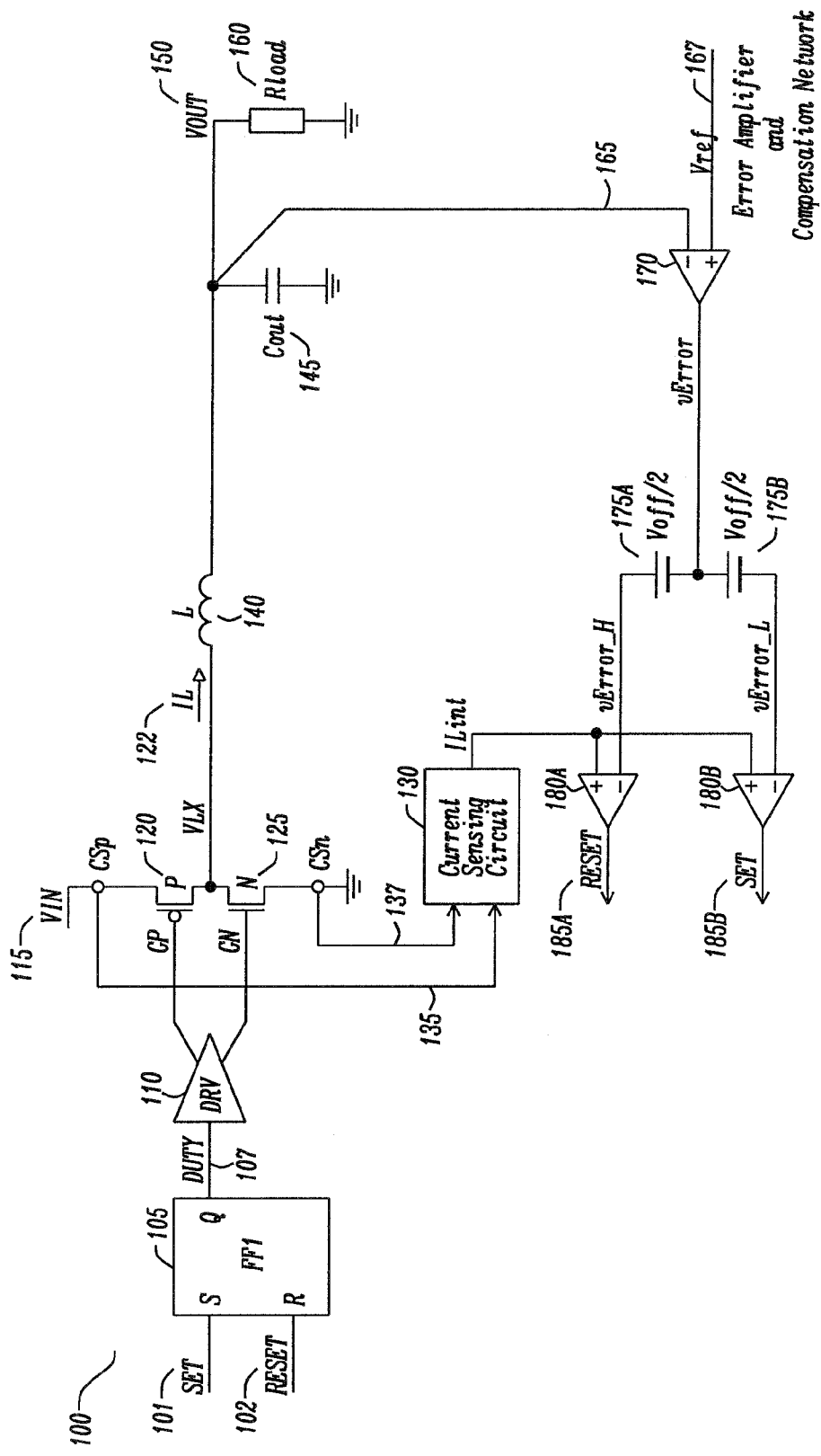
FIG. 1 is a circuit schematic of a current mode hysteretic controller known to the inventor.
Figure 2:
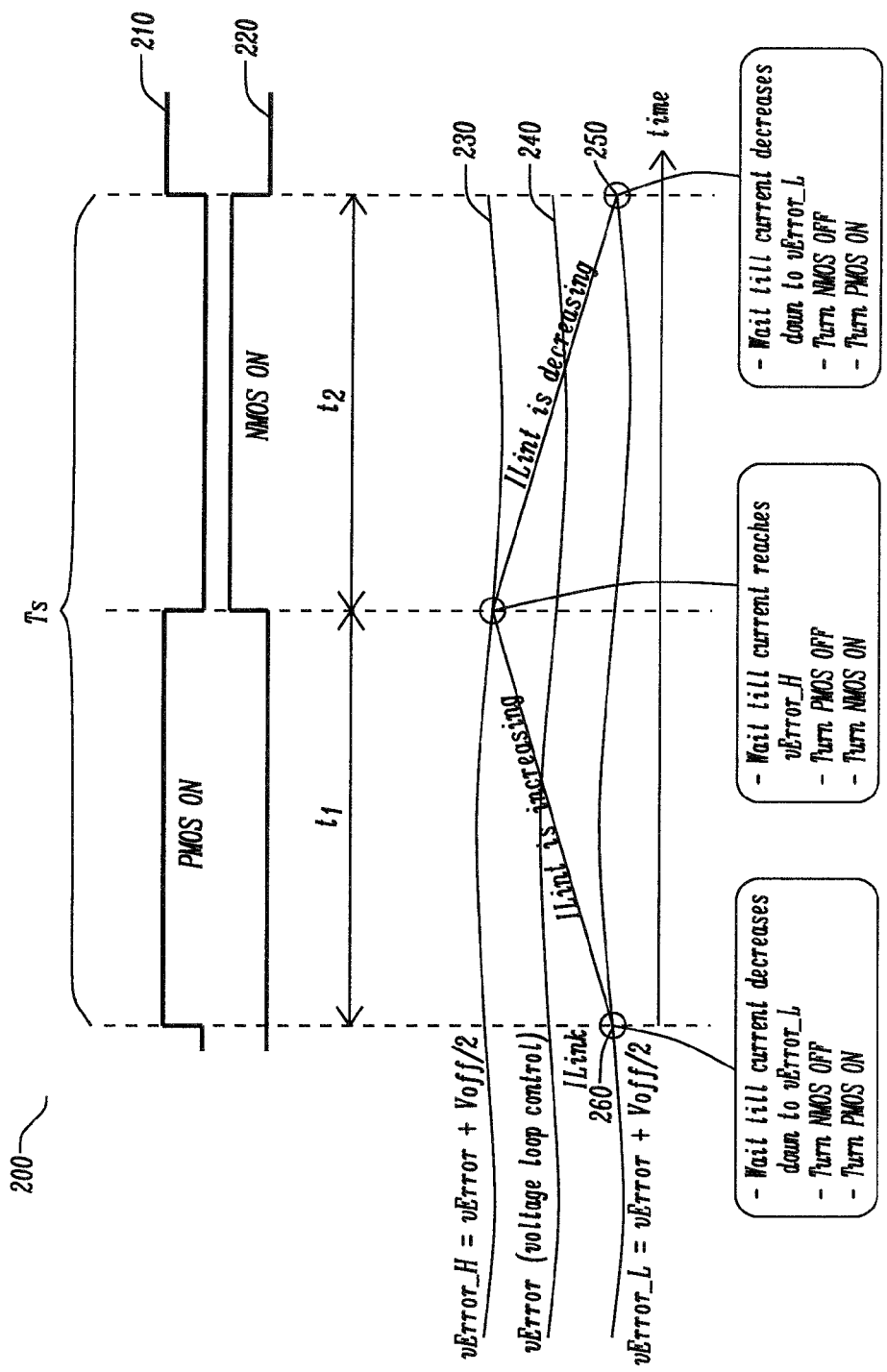
FIG. 2 is a timing diagram of a current mode hysteretic controller known to the inventor.
Figure 3:
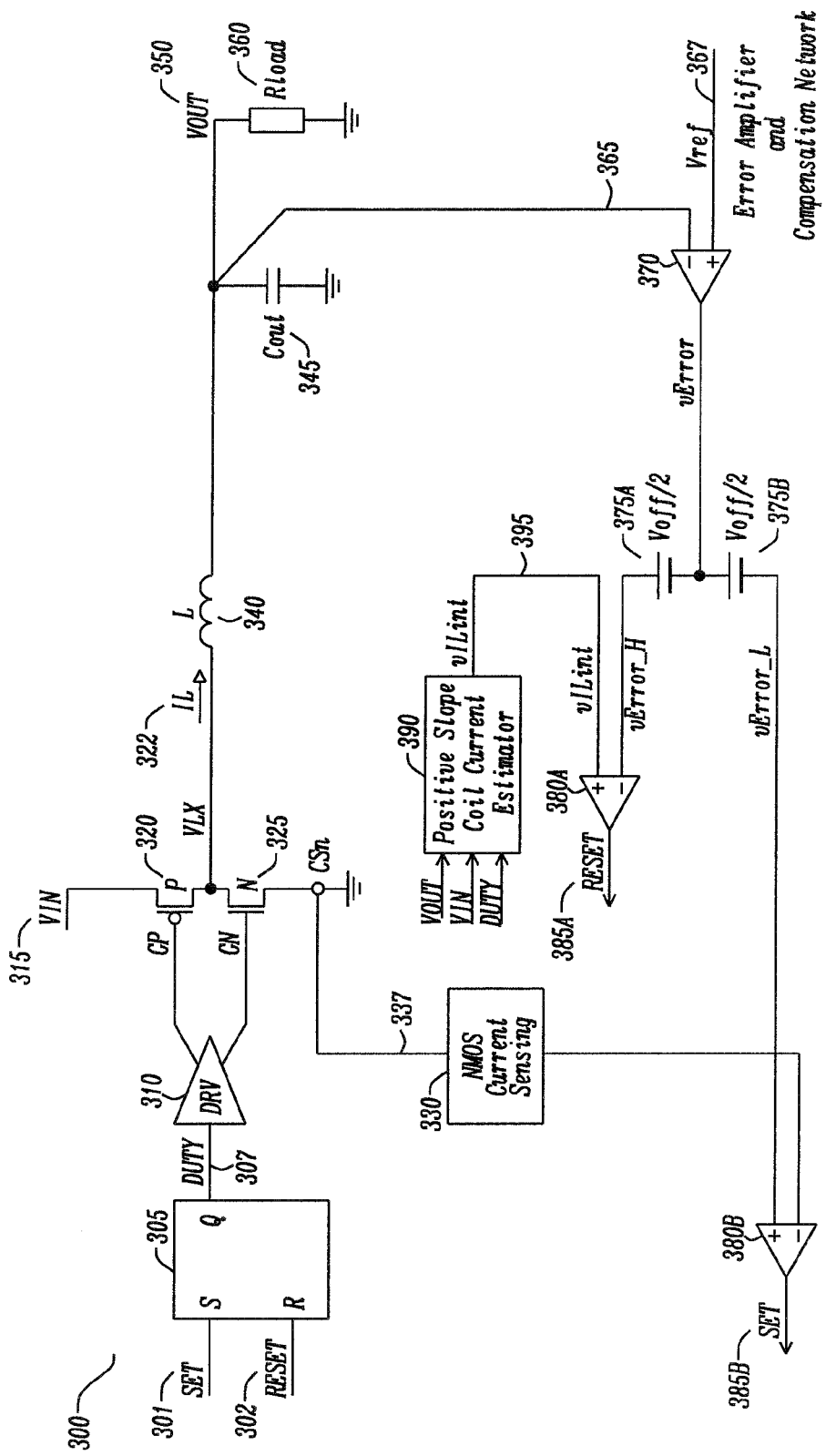
FIG. 3 is a circuit schematic in accordance with a first embodiment of the disclosure.

FIG. 3 is a circuit schematic in accordance with a first embodiment of the disclosure for a current mode voltage regulator. A simplified schematic of the controller is shown in FIG. 3. In this embodiment, the current in the coil for the positive current slope is not directly measured but it is estimated by the 'Positive Slope Coil Current Estimator.' The negative slope is measured via common current sensing circuitry marked as 'CSn' and 'NMOS Current Sensing' block. FIG. 3 shows the positive slope estimation is evaluated from the "pull-up" device (e.g. PMOS transistor) and negative sensing from the "pull-down" device (e.g. NMOS transistor). Note that the first embodiment of the disclosure can be modified where the slope estimation is evaluated from the "pull-down" device (e.g. NMOS transistor), and the current sensing from the "pull-up" device (e.g. PMOS transistor).

FIG. 3 shows a hysteretic current-mode controller 300. The controller, which is preferably a buck converter 300, consists of a SR flip-flop 305 with inputs SET 301 and RESET 302. The SR flip-flop 305 provides a DUTY signal output 307 to pre-drive circuitry of the driver circuitry 310. The signal VIN 315 provides power to the output circuit comprising a p-channel MOSFET pull-up device 320 and an n-channel MOSFET pull-down device 325. The center node VLX is connected between the p-channel MOSFET 320 and n-channel MOSFET 325 providing a current IL to the output. The output node is connected to the inductor 340, the output capacitor 345 for the output signal 350, and output load 360.

A feedback network establishes a sensing scheme to current sensing circuit NMOS Current Sensing 330. Current in the inductor coil 340 is measured via current sensing circuit NMOS Current Sensing CSn 337 when the NMOS is on. The circuit contains an Error amplifier 370, with two input signals, feedback signal 365 and reference signal 367; the Error amplifier 370 is coupled to a compensation network. The error amplifier compares the output voltage with the reference voltage Vref and generates error signal vError. This signal is a base for two signals vError_H 375A and vError_L 375B which are shifted up and down from the vError by Voff/2 respectively. The signal vError_L is connected to a comparator 380B producing an output signal SET 385B. The signal vError_H 380A is connected to a comparator 380A producing an output signal Reset 385A. The comparator 380A receives a signal VILint 395 from the Positive Slope Coil Current Estimator 390. The comparator 380B receives a signal from the NMOS Current Sensing block 330. The Positive Slope Coil Current Estimator 390 has three inputs of VOUT 350, VIN 315, and DUTY 307.

Figure 4:
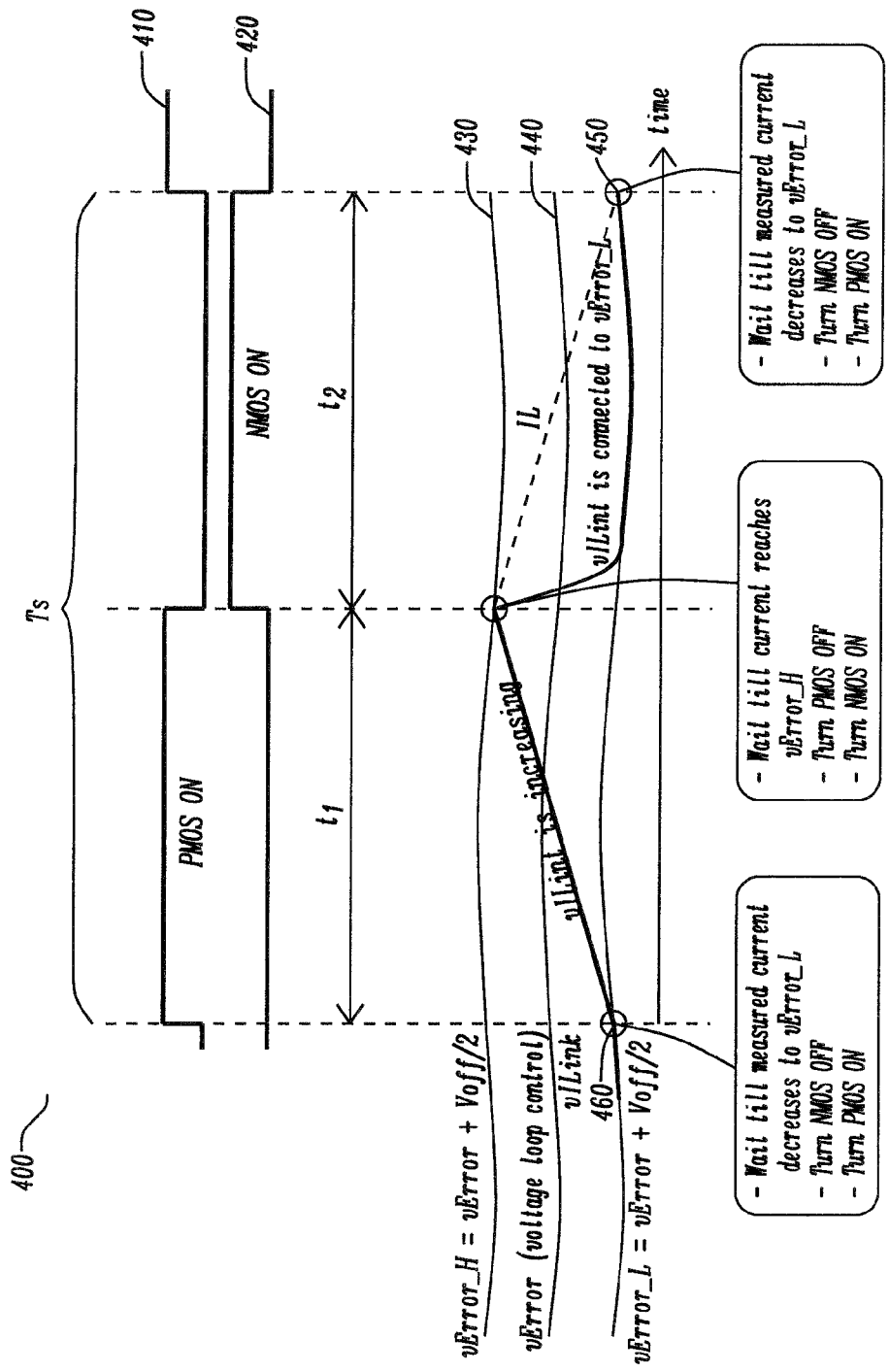
FIG. 4 is a timing diagram in accordance with a first embodiment of the disclosure.

FIG. 4 shows the timing diagram 400 for the signals. The PMOS signal 410 and the NMOS signal 420 show the "ON" and "OFF" states of the output stage. The signal vError_H 430, vError 440, and vError_L 450 are shown during the timing cycle. The output voltage vILint 460 of the Positive Slope Coil Current Estimator 390 corresponds to the instantaneous current in the inductor during the PMOS period.

The operation of the hysteretic buck converter includes a sequence of steps. The first step (a) PMOS is turned ON, and the current in the coil is being estimated in the estimator. The second step (b) The voltage vILint is increasing with the same shape as the current in the coil. The third step (c) When the vILint reaches the vError_H, the PMOS is turned OFF.

The fourth step (d) NMOS is turned ON, and current sensing circuit measures the current. A fifth step (e) vILint 460 is connected to vError_L during the NMOS period. A sixth step (f) when the coil current reaches the vError_L, the NMOS is turned OFF. And, lastly the seventh step (g) the procedure then repeats to step (a).

Figure 5:
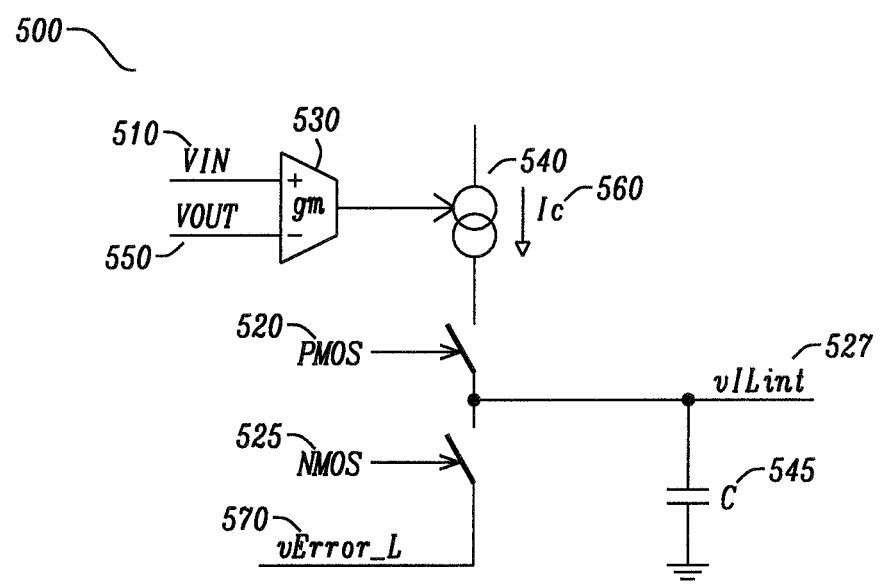
FIG. 5 is a circuit schematic in accordance with a first embodiment of the disclosure of a PMOS current estimator; and, FIG. 6 is a method in accordance with a first embodiment of the disclosure.

FIG. 5 is a circuit schematic in accordance with the first embodiment of the disclosure of the core estimator 390 shown in FIG. 3. The circuit 500, showing the details of estimator 390, contains two switches 520 and 525 which are turned ON when PMOS device 320 and NMOS 325 of FIG. 3) are turned ON respectively. The core estimator 500 includes a transconductance block gm 530, with inputs VIN 510 and VOUT 550 which provide current IC 560. The output capacitor 545 is charged with the current IC 560 during PMOS period only. During the PMOS period the voltage vILint 527 is proportional to the instantaneous current in the coil. The capacitor 545 is connected to vError_L during NMOS period.

To provide a signal with the same shape as the current in the coil, the following derivation illustrates the general behaviour. The following equation describes the general behaviour of the current in the coil.

$$i_L(t) = \frac{1}{L}\int v_L(t)dt$$

Given, the inductor voltage $v_L(t)$ does not vary in time, this can be simplified and replace $v_L$ with Vin and Vout for each portion of the clock-cycle t1 and t2.
For t1 interval:

$$i_{L1}(t) = \frac{1}{L}(Vin - Vout) \cdot t$$

and for time interval t2:

$$i_{L1}(t) = -\frac{1}{L}Vout \cdot t$$

The voltages Vin and Vout are taken from the input and from the voltage feed-back node so no additional pin is necessary. For simple estimation of the current in the control circuit, a similar response that resembles the current in time variation is needed (as described in the prior section). A good candidate is a simple capacitor with basic equation of:

$$v_C(t) = \frac{1}{C}\int i_C(t)dt$$

This equation is similar to the original one for the current in the inductor. In order to get the same shape of the output voltage the capacitor must be charged with a current with the same shape as the voltage across the inductor (Vin–Vout).

$$i_L(t) = \frac{1}{L}\int v_L(t)dt$$

The equation for the voltage on capacitor resembles the equation for the current in the inductor. If the capacitor is charged with a current proportional to the (Vin–Vout) for interval t1 or Vout for interval t2, then the same shape of the output voltage will be achieved, as the current in the coil. Interval t1:

$$v_{C1}(t) = \frac{1}{C}gm \cdot (Vin - Vout) \cdot t + v_C(0)$$

and for time interval t2:

$$v_{C1}(t) = -\frac{1}{C}gm \cdot Vout \cdot t + v_C(0)$$

where gm is a trans-conductance which transfers the voltage to the current and it is assumed to be constant. Initial value $v_C(0)$ is the value where the charging started from.

FIG. 6 is a method in accordance with the first embodiment of the disclosure. The hysteretic buck converter 600 providing a first step 610 (a) providing a hysteretic buck converter with a PMOS pull-up, a NMOS pull-down, a pre-drive circuit, a SR flip-flop, an inductor, a capacitor, an error amplifier, a compensation circuit, an NMOS Current Sensing block, a Positive Slope Coil Current Estimator, a SET comparator, and a RESET comparator, a second step 620 (b) estimating the current in the inductor when said PMOS transistor pull-up is turned ON, a third step 630 (c) increasing the voltage vILint which represents the current in the inductor (estimated inductor current), a fourth step 640 (d) turning off said PMOS transistor when the voltage vILint (estimated inductor current) reaches the high error voltage vError_H, the fifth step 650 (e) sensing the current when said NMOS transistor is turned ON, using said current sensing circuit, a sixth step 660 (f) evaluating the voltage vILint when connected to low error voltage vEiTor_L during this period of time, and a seventh step 670 (g) turning off said NMOS transistor when the coil current reaches the low error voltage vError_L. In the sequence, this is repeated, where the procedure then repeats to step (b) 620. It should be noted that the description and drawings illustrate a method and system of a first process of evaluation of slope estimation as well as a second process for current sensing. This method can be modified by having the slope estimation process evaluated by the NMOS transistor, and the current sensing process sensed from the PMOS transistor.

It should be noted that the description and drawings merely illustrate the principles of the proposed methods and systems. It will thus be appreciated that those skilled in the art will be able to devise various arrangements that, although not explicitly described or shown herein, embody the principles of the invention and are included within its spirit and scope. The role of the transistors serve as "switches." Hence it is in the spirit and scope of the application to have different types of switches from MOS switches, LDMOS switches to bipolar junction transistors. The method can include a reversal of the role of the "pull-up" transistor, and the "pull-down" transistor wherein it is in the spirit and scope of the invention to have a "negative slope inductor coil estimator." For this methodology, the current estimator, for negative slope estimator, only requires an output voltage, Vout, as an input to the transconductance stage (e.g. GM stage since there is directly an output voltage across the inductor during the NMOS period of the operational cycle (e.g. note not the difference between the input and output voltage, Vin–Vout).

For the positive slope estimator, both the input voltage Vin and the output voltage Vout are required for the input signals.

It should be noted that the description and drawings merely illustrate the principles of the proposed methods and systems. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Other advantages will be recognized by those of ordinary skill in the art. The above detailed description of the disclosure, and the examples described therein, has been presented for the purposes of illustration and description. While the principles of the disclosure have been described above in connection with a specific device, it is to be clearly understood that this description is made only by way of example and not as a limitation on the scope of the disclosure.

What is claimed is:

1. A power converter, comprising
   a buck converter comprising a high side switch, an inductor and a low side switch;
   a current sensing circuit configured to sense a current through the low side switch;
   a positive slope inductor coil current estimator circuit configured to estimate a magnitude of a current through the inductor while the high side switch is ON, wherein an output voltage Vout of the power converter is one of parameters used for said estimation;
   an error amplifier configured to sense the output of said buck converter;
   a compensation network configured to receive a feedback signal from said error amplifier;
   a first comparator configured to provide a comparison signal in parallel to said current sensing circuit and said positive slope inductor coil current estimator; and
   a second comparator configured to provide a comparison signal in parallel to said positive slope inductor coil current estimator;
   wherein said error amplifier and said compensation network are configured to provide a comparison signal by comparing by the error amplifier an output voltage of the power converter with a reference voltage, wherein the comparison signal is a base for a first error signal, which is shifted up by an offset voltage, wherein the first error signal is a first input to the first comparator, wherein a second input of the first comparator is an output of the positive slope inductor coil estimator and wherein the comparison signal is a base for a second error signal, which is shifted down by the offset voltage, wherein the second error signal is a first input to the second comparator, wherein a second input of the second comparator is an output of said current sensing circuit.

2. The power converter of claim 1 further comprising an output stage configured to provide current to an inductor coil; and a pre-drive circuit block configured to provide a signal to said output stage.

3. The power converter of claim 2 wherein the output stage comprising a first and second transistor.

4. The power converter of claim 2 further comprising an SR flip-flop configured to establish a DUTY control signal for said pre-drive circuit block.

5. The power converter of claim 1 wherein the positive slope inductor coil current estimator is configured to receive signals from the input voltage signal, the output voltage signal and a DUTY signal.

6. A current estimator circuit, comprising:
   a transconductance network configured to provide an output current proportional to vin-vout voltage signal;
   a first switch, comprising a PMOS device, configured to receive said output current of said transconductance network, wherein a first terminal of said first switch is directly connected to an output of said transconductance network;
   a second switch, comprising an NMOS device, wherein a first terminal of the second switch is connected directly to a second terminal of said first switch and a second terminal of the second switch is connected is connected to a voltage Verror L which is dependent upon the vin-vout voltage signal;
   an output node configured to be coupled between said first switch and said second switch; and
   a capacitor configured to be coupled to said output node.

7. The current estimator circuit of claim 6 wherein said transconductance network is configured to receive an input voltage signal and an output signal.

8. The current estimator circuit of 7, further comprising an inductor coil connected to said current estimator circuit wherein said current estimator circuit estimates a positive slope of current through the inductor coil and current sensing for a negative slope of current through the inductor coil.

9. The current estimator circuit of 7 further comprising an inductor coil connected to said current estimator circuit wherein said current estimator circuit estimates a negative slope of current through the inductor coil and current sensing for a positive slope of current through the inductor coil.

10. A method of providing an improved current estimation in a power converter comprises the steps of:
   (a) providing a power converter comprises a low side switch, a high side switch, an inductor, a pre-drive network, a current sensing circuit, a positive slope inductor coil estimator, an error amplifier, a compensation network, and a first and second comparator;
   (b) sensing a current magnitude in a signal low side switch;
   (c) estimating an inductor current magnitude in the positive slope inductor coil current estimator, while the high side switch is ON, wherein an output voltage Vout of the power converter is one of parameters used for said estimation;
   (d) adjusting a current in the output of the power converter;
   wherein said error amplifier and said compensation network are configured to provide a comparison signal by comparing by the error amplifier an output voltage of the power converter with a reference voltage, wherein the comparison signal is a base for a first error signal, which is shifted up by an offset voltage, wherein the first error signal is a first input to the first comparator, wherein a second input of the first comparator is an output of the positive slope inductor coil estimator and wherein the comparison signal is a base for a second error signal, which is shifted down by the offset voltage, wherein the second error signal is a first input to the second comparator, wherein a second input of the second comparator is an output of said current sensing circuit.

11. A method of providing an improved current estimation in a switching regulator comprises the steps of:
   (a) providing a hysteretic buck converter with a PMOS transistor pull-up, a NMOS transistor pull-down, a pre-drive circuit, a SR flip-flop, an inductor, a capacitor, an error amplifier, a compensation network, an NMOS Current Sensing block, a Positive Slope Coil Current Estimator, a first comparator, and a second comparator;
   (b) estimating the current in the inductor when said PMOS transistor pull-up is turned ON, wherein the voltage across the inductor vILint is increasing along with the current in the inductor;
   (c) turning off said PMOS transistor when the inductor voltage vILint reaches the high error voltage vError_H;
   (d) sensing the current when said NMOS transistor is turned ON, using said current sensing circuit;
   (e) connecting voltage vILint to low error voltage vError_L during this period of time; and
   (g) turning off said NMOS transistor when the coil current reaches the low error voltage vError_L;
   wherein said error amplifier and said compensation network are configured to provide a comparison signal by comparing by the error amplifier an output voltage of the switching regulator with a reference voltage, wherein the comparison signal is a base for a first error signal, which is shifted up by an offset voltage, wherein the first error signal is a first input to the first comparator, wherein a second input of the first comparator is an output of the positive slope inductor coil estimator and wherein the comparison signal is a base for a second error signal, which is shifted down by the offset voltage, wherein the second error signal is a first input to the second comparator wherein a second input of the second comparator is an output of said current sensing circuit.

12. The method of claim 11 further comprises the step of: repeating the process of estimating the current in the inductor when said PMOS pull-up is turned on.

13. A power converter, comprising
   a buck converter comprising a low side switch, an inductor and a high side switch;
   a current sensing circuits configured to sense a current through the high side switch;
   a pre-drive block coupled to said low side switch and said high side switch; and
   a negative slope inductor coil current estimator circuit configured to estimate a magnitude of a current through the inductor while the low side switch is ON, wherein an output voltage Vout of the power converter is one of parameters used for said estimation;
   a first comparator configured to provide a comparison signal in parallel to said current sensing circuit and said positive slope inductor coil current estimator; and
   a second comparator configured to provide a comparison signal in parallel to said positive slope inductor coil current estimator;
   an error amplifier configured to sense the output of said buck converter; and
   a compensation network configured to receive a feedback signal from said error amplifier;
   wherein said error amplifier and said compensation network are configured to provide a comparison signal by comparing by the error amplifier an output voltage of the power converter with a reference voltage, wherein the comparison signal is a base for a first error signal, which is shifted up by an offset voltage, wherein the first error signal is a first input to the first comparator, wherein a second input of the first comparator is an output of the negative slope inductor coil estimator and wherein the comparison signal is a base for a second error signal, which is shifted down by the offset voltage, wherein the second error signal is a first input to the second comparator, wherein a second input of the second comparator is an output of said current sensing circuit.

14. The power converter of claim 13 further comprising a first comparator configured to provide a comparison signal in parallel to said current sensing circuit and said negative slope inductor coil current estimator.

15. The power converter of claim 14 further comprising a second comparator configured to provide a comparison signal in parallel to said negative slope inductor coil current estimator.

* * * * *